(12) United States Patent
Lu et al.

(10) Patent No.: US 10,984,764 B2
(45) Date of Patent: Apr. 20, 2021

(54) GUITAR AND MANUFACTURING METHOD THEREOF

(71) Applicant: GUANGZHOU LAVA MUSIC INFO TECH LTD., Guangzhou (CN)

(72) Inventors: Zi-Tian Lu, Guangzhou (CN); Rui Zhong, Guangzhou (CN)

(73) Assignee: GUANGZHOU LAVA MUSIC INFO TECH LTD., Guangzhou (CN)

(*) Notice: Subject to any disclaimer, the term of this patent is extended or adjusted under 35 U.S.C. 154(b) by 0 days.

(21) Appl. No.: 16/787,340

(22) Filed: Feb. 11, 2020

(65) Prior Publication Data
US 2020/0184936 A1    Jun. 11, 2020

Related U.S. Application Data

(63) Continuation-in-part of application No. PCT/CN2018/099863, filed on Aug. 10, 2018.

(30) Foreign Application Priority Data

Aug. 11, 2017  (CN) .......................... 201710683310.1

(51) Int. Cl.
| | |
|---|---|
| *G10D 3/04* | (2020.01) |
| *G10D 3/22* | (2020.01) |
| *C08K 7/02* | (2006.01) |
| *C08K 7/06* | (2006.01) |
| *C08K 7/14* | (2006.01) |
| *G10D 1/08* | (2006.01) |
| *G10D 3/06* | (2020.01) |

(52) U.S. Cl.
CPC ................. *G10D 3/22* (2020.02); *C08K 7/02* (2013.01); *C08K 7/06* (2013.01); *C08K 7/14* (2013.01); *G10D 1/08* (2013.01); *G10D 3/04* (2013.01); *G10D 3/06* (2013.01)

(58) Field of Classification Search
CPC .. G10D 3/22; G10D 1/08; G10D 3/04; G10D 3/06; G10D 3/00; C08K 7/02; C08K 7/06; C08K 7/14; C08K 2201/004; B29C 2045/0096; B29C 2945/76732; B29C 45/76; B29C 45/77; B29C 45/78; B29L 2031/758
See application file for complete search history.

(56) References Cited

U.S. PATENT DOCUMENTS

| | | | |
|---|---|---|---|
| 2006/0032358 A1* | 2/2006 | Rautia | G10D 3/22 84/293 |
| 2015/0135930 A1* | 5/2015 | Luttwak | G10D 3/04 84/307 |
| 2016/0063984 A1* | 3/2016 | Kosonen | C08K 7/02 252/62 |

FOREIGN PATENT DOCUMENTS

| | | |
|---|---|---|
| CN | 201449720 U | 5/2010 |
| CN | 103413541 A | 11/2013 |
| CN | 103507212 A | 1/2014 |

\* cited by examiner

*Primary Examiner* — Kimberly R Lockett
(74) *Attorney, Agent, or Firm* — ScienBiziP, P.C.

(57) ABSTRACT

A guitar includes fibers of lengths between 0.2 millimeters to 3 millimeters. The guitar further includes a guitar body, a headstock board, a soundboard, a fretboard, and a guitar bridge. Each of the guitar body, the headstock board, the soundboard, the fretboard, and the guitar bridge is a continuous and single structure. The disclosure also relates to a guitar and a method for manufacturing a guitar. The guitar is superior to the traditional acoustic guitars in terms of volume and mechanical performance, so that a service life of the guitar of the application can be increased by 2 to 3 times compared with traditional acoustic guitars and durable.

16 Claims, 3 Drawing Sheets

GUITAR AND MANUFACTURING METHOD THEREOF

CROSS-REFERENCE TO RELATED APPLICATIONS

This application claims all benefits accruing under 35 U.S.C. § 119 from China Patent Application No. 201710683310.1, filed on Aug. 11, 2017, in the China National Intellectual Property Administration, the content of which is hereby incorporated by reference. This application is a continuation-in-part under 35 U.S.C. § 120 of international patent application PCT/CN2018/099863 filed Aug. 10, 2018.

FIELD

The subject matter herein generally relates to a guitar, and more particularly, to a guitar and a manufacturing method of the guitar.

BACKGROUND

A guitar is a member of a stringed instrument family that produces sounds by plucking strings above the guitar. While playing, one hand plucks the strings and the fingers of the other hand press against a fretboard of the guitar. The fretboard is a metal strip covering a neck of the guitar. Sound played on the strings is enhanced by the guitar's resonance box.

According to structural characteristics, guitars can be divided into hollow wood guitars, hollow electric box guitars, semi-hollow electric box guitars, and solid electric guitars. An acoustic guitar relies on the resonance of the strings and the resonance box to produce natural and pleasing sounds, which is generally favored by players and audience. At present, most of the guitars on the market are acoustic guitars. An acoustic guitars can absorb moisture and/or be cracked easily, which will affect the life of the guitar. In addition, a volume of the guitar is generally small, which may affect the experience of the players, especially for players who have higher requirements for a texture of the guitar. Traditional acoustic guitars may not meet the requirement of the players.

In addition, conventional methods of manufacturing guitars, a series of processing steps such as adaptors, hot-pressing of a back side plate, head carving and sound beam cutting are required. Generally, the processing of traditional wood guitars requires nearly 200 procedures and processing techniques, which may be cumbersome, labor intensive and produce a lot of waste material, all result in an increased production cost of guitars. Therefore, a new design of a guitar is desired.

BRIEF DESCRIPTION OF THE DRAWINGS

Implementations of the present disclosure will now be described, by way of embodiments, with reference to the attached figure.

DETAILED DESCRIPTION

Figure 1:
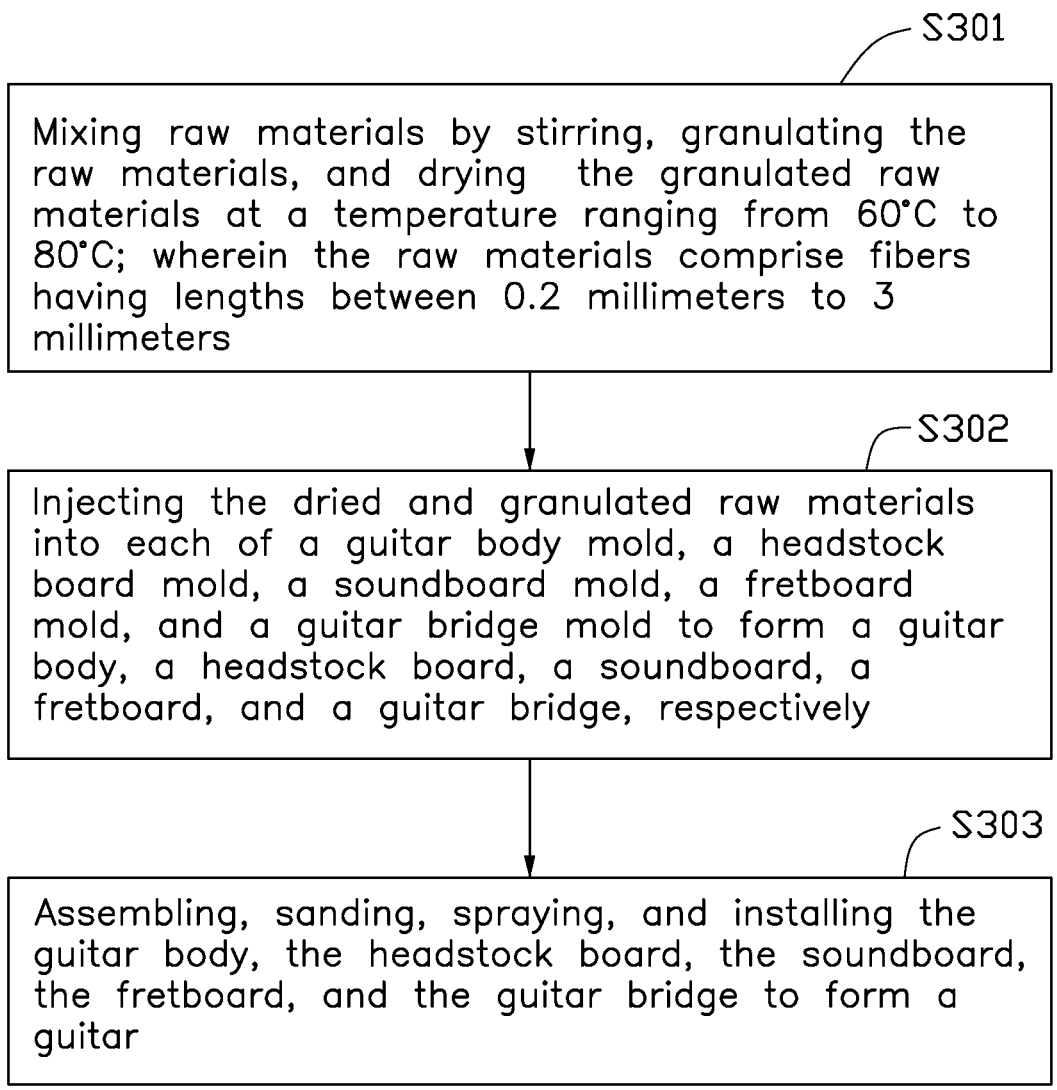
FIG. 1 is a flowchart of a method for manufacturing a guitar in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

Implementations of the disclosure will now be described, by way of embodiments only, with reference to the drawing.

FIG. 1 illustrates a flow chart of a method for manufacturing a guitar in accordance with an embodiment of the present disclosure. The example method is provided by way of example, as there are a variety of ways to carry out the method. The method described below can be carried out using the configurations illustrated in FIGS. 2-3, for example, and various elements of these figures are referenced in explaining example method. Each block shown in FIG. 1 represents one or more processes, methods, or subroutines, carried out in the example method. Additionally, the illustrated order of blocks is by example only and the order of the blocks can change. The example method can begin at block 301.

At block 301, all raw materials of a guitar are mixed by stirring, granulated, and dried at a temperature ranging from 60° C. to 80° C.

The raw materials are mainly fibers and polymer base materials. The fibers have lengths between 0.2 millimeters to 3 millimeters. The fibers can be better compatible with polymer base materials, so as to achieve a seamless connection from a guitar neck to structures of the guitar body, thereby ensuring batch products have an extremely small tolerances, and making a guitar with bigger sound than a conventional wood guitar of the same volume, thus enhancing performances of the guitar.

The fibers can be selected from, but not limited to, at least one of glass fibers, wood fibers and carbon fibers.

The polymer base materials can be selected from, but not limited to, at least one of acrylonitrile-butadiene-styrene copolymer, acrylate-styrene-acrylonitrile copolymer, and polycarbonate.

In addition, due to the good compatibility between the fibers and the polymer base materials, surfaces of the guitar can be sprayed, electroplated, and sandblasted to enhance the appearances of the guitar. The fibers which are too long or too short may affect the performances of the guitar.

Compared with wood, the fibers can make the guitar be less susceptible to deformation due to humidity and can produce musical instruments which are more stable and durable. The guitar according to the present disclosure has a high stiffness and strength, which can well support tensions of the strings. Moreover, the guitar according to the present disclosure has a low density and a high stiffness. The guitar according to the present disclosure can obtain better acoustic quality by adjusting a sound beam structure (not shown) of the guitar.

Before mixing the raw materials, the method for manufacturing the guitar further including: pre-drying the raw materials first in a temperature between 60° C. to 80° C. for 3 hours to 5 hours, and more preferably is 4 hours according to an embodiment of the present disclosure. The pre-drying can make the raw materials has a higher integrated degree during subsequent injection molding and make the guitar be more water repellent, thereby having a long service life.

Figure 2:
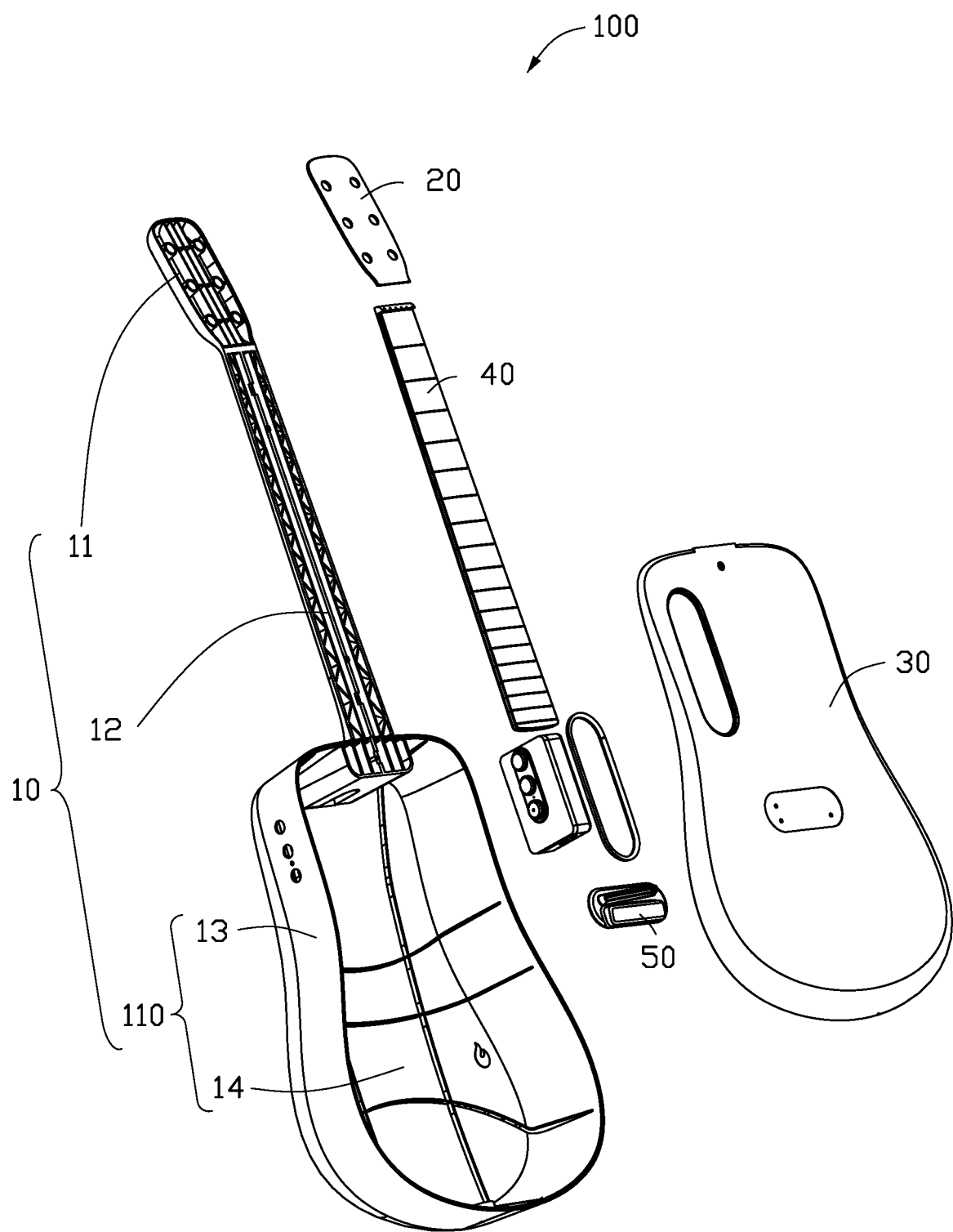
FIG. 2 is an exploded view of a guitar manufactured according the method of FIG. 1.

At block 302, referring to FIG. 2, the dried and granulated and dried raw materials are injected into a guitar body mold, a headstock board mold, a soundboard mold, a fretboard mold, and a guitar bridge mold to mold a guitar body 10, a headstock board 20, a soundboard 30, a fretboard 40, and a guitar bridge 50, respectively.

The guitar body 10 includes a headstock 11, a neck 12, a bottom deck 13, and body sides 14. The headstock 11, the neck 12, the bottom deck 13, and the body sides 14 is a continuous and single structure. A bucket body 110 is defined by the bottom deck 13 and the body sides 14. That is, the guitar body mold makes the headstock 11, the neck 12, and the bucket body 110 be integrally formed.

The manufacturing method as disclosed in the present disclosure provided simple and easy processes of making a guitar. Furthermore, the preparation procedures as disclosed in the present disclosure can be carried out in relatively mild operating conditions, which can further reduce operating costs. The guitar 100 has a more stable structure, a more stable sound transmission mechanism, and a better quality.

A method for injecting the dried and granulated raw materials including: firstly, the raw materials are melted at a temperature ranging from 190° C. to 230° C. to form barrel materials; secondly, the barrel materials are maintained at a temperature ranging from 180° C. to 230° C. for a preset period of time; and thirdly, the barrel materials are injected into the guitar body mold, the headstock board mold, the soundboard mold, the fretboard mold, and the guitar bridge mold at a temperature ranging from 60° C. to 120° C. Each stage requires different temperature control to ensure the quality of the guitar 100.

Before the barrel materials are injected, the barrel materials are maintained at a temperature ranging from 180° C. to 230° C. Embodiments of the present disclosure, the barrel materials are maintained at multiple steps of temperatures to achieve a better temperature control.

Maintaining the barrel materials at temperature ranging from 180° C. to 230° C. for a preset period of time further comprising: maintaining the barrel materials a temperature ranging from 180° C. to 200° C.; maintaining the barrel materials a temperature ranging from 190° C. to 220° C.; maintaining the barrel materials a temperature ranging from 200° C. to 230° C.

A most critical step in the entire process is the process of injecting the raw material into molds. A method of injecting the dried and granulated raw materials further comprising: controlling an injection pressure between 50 MPa to 180 MPa, and controlling a molding time between 90 seconds to 180 seconds In addition, in one implementation of the present disclosure, the guitar body mold, the headstock board mold, the soundboard mold, the fretboard mold, and the guitar bridge mold are kept warm before injection to ensure the subsequent injection process can be carried out smoothly.

Figure 3:
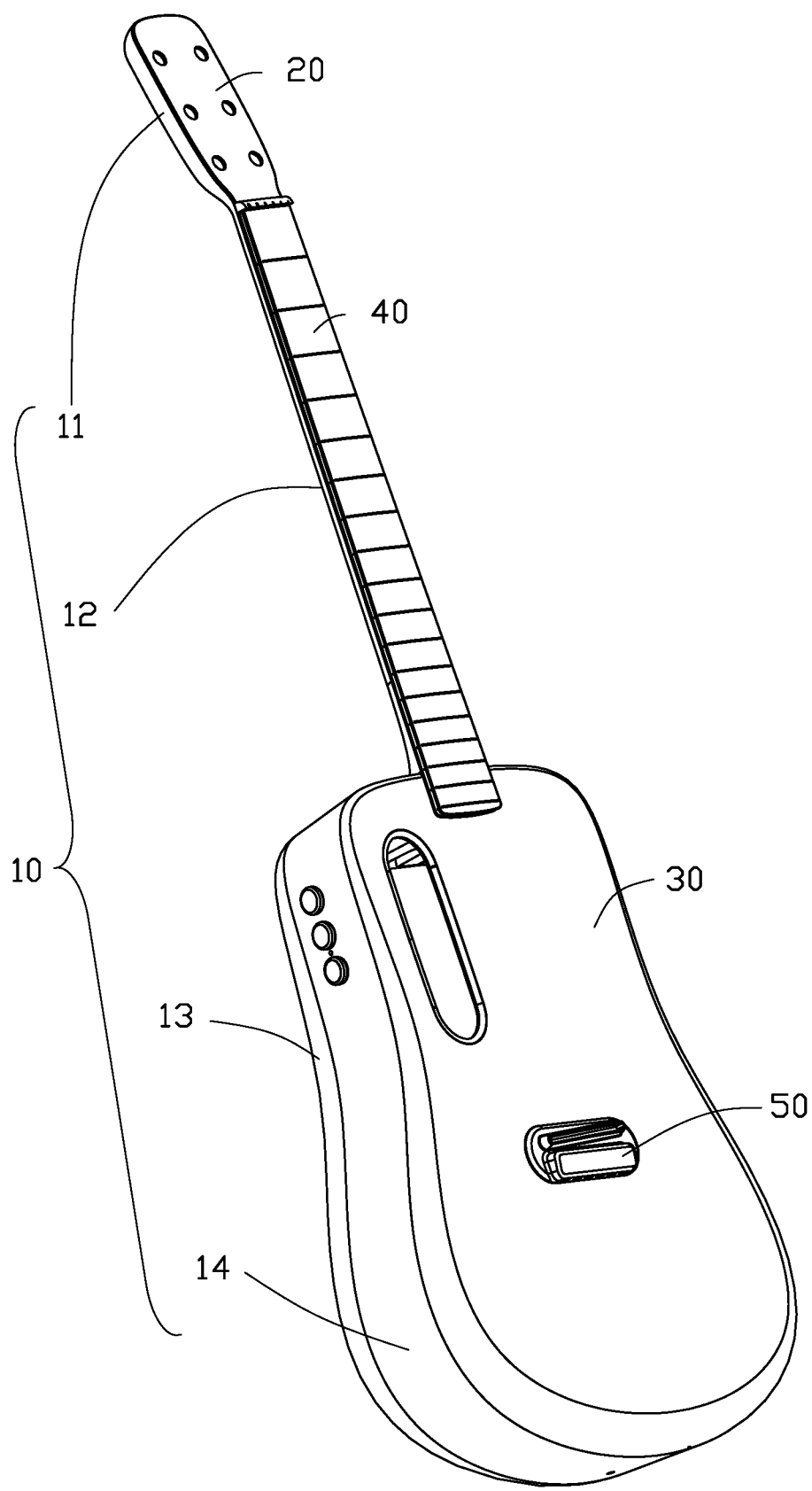
FIG. 3 is a perspective view of the guitar of FIG. 2.

At block 303, referring to FIG. 3, the guitar body 10, the headstock board 20, the soundboard 30, the fretboard 40, and the guitar bridge 50 are assembled, sanded, sprayed, and installed to form a guitar.

A process for assembling includes: the soundboard 30 is connected to the guitar body 10; the headstock board 20 and the fretboard 40 are glued on the guitar body 10, respectively, after the soundboard is connected to the guitar body 10; the guitar bridge 50 is installed on the soundboard 30 to form a guitar 100. The soundboard 30 is connected to the bucket body 110 of the guitar body 10. The headstock board 20 is formed on the headstock 11. The fretboard 40 is formed on the neck 12 of the guitar body 10. The guitar bridge 50 is installed on the soundboard 30.

A process for sanding and spraying includes: sanding surfaces of the assembled guitar with a sander, filling gaps between each component with a filler material, and painting the surface of the guitar with color by spray painting.

A process for installing includes: a string pillow, a few of tuners, a few of strings and other accessories are installed into the guitar 100.

FIGS. 2-3 show an embodiment of a guitar 100. Materials of the guitar 100 mainly includes fibers. The fibers have a length that is controlled between 0.2 millimeters to 3 millimeters. The fibers can be selected from, but not limited to, at least one of glass fibers, wood fibers and carbon fibers.

The guitar 100 includes a guitar body 10, a headstock board 20, a soundboard 30, a fretboard 40, and a guitar bridge 50. Each of the guitar body 10, the headstock board 20, the soundboard 30, the fretboard 40, and the guitar bridge 50 is a continuous and single structure. The guitar body 10 includes a headstock 11, a neck 12, a bottom deck 13, and body sides 14. A bucket body 110 is defined by the bottom deck 13 and the body sides 14. The soundboard 30 is connected to the bucket body 110 of the guitar body 10. The headstock board 20 is formed on the headstock 11. The fretboard 40 is formed on the neck 12 of the guitar body 10. The guitar bridge 50 is installed on the soundboard 30.

The guitar 100 also includes a string pillow, a few of tuners, a few of strings, and other accessories, which are not shown in the FIGS. 1-3.

Example 1

1) Fiber pre-processing: the fiber raw materials are cut and prepared, and the raw materials have lengths between 0.2 millimeters to 3 millimeters.

2) Mixing: the fiber raw materials are mixed by stirring.

3) Granulation: the mixed fiber raw materials are put into a granulator and extruded to produce fiber composite particles.

4) Prepare the mold: prepare a guitar body mold (including the head, neck and barrel, three parts of the body), a guitar body support mold, a headstock board mold, a soundboard mold, a fretboard mold and a bridge mold, a total of five molds.

5) Injection: material pre-drying: the fiber composite particles are put in a drying box, and dried at a temperature ranging from 60° C. to 80° C. for 3 hours to 5 hours, and then, the granulated raw materials dried are injected in a guitar body mold, a headstock board mold, a soundboard mold, a fretboard mold, and a guitar bridge mold to mold a guitar body, a headstock board, a soundboard, a fretboard, and a guitar bridge, respectively.

The specific parameters of injection are as follows:
Melt temperature: ranging from 190° C. to 230° C.;
Barrel temperature: ranging from 180° C. to 230° C.;

Mold temperature: ranging from 60° C. to 120° C.;
Forming time: ranging from 90 seconds to 180 seconds;
Injection pressure: ranging from 50 MPa to 180 MPa;
Mold holding time: ranging from 30 seconds to 90 seconds.

6) Assembling includes: firstly, the soundboard is connected into the guitar body; secondly, the headstock board and the fretboard are glued on the guitar body after the soundboard is connected into the guitar body; thirdly, the guitar bridge is installed on the guitar body to form a complete guitar.

7) Sanding and spraying includes: sanding the surface of the assembled guitar with a sander, filling the gaps between each component with filler, and then painting the surface of the guitar with color to spray paint.

8) Installing includes: a string pillow, a few of tuners, a few of strings, and other accessories are installed into the guitar body to form the guitar.

Example 2

1) Fiber pre-processing: the fiber raw materials are cut and prepared, and the raw materials have lengths between 0.2 millimeters to 3 millimeters.

2) Mixing: the fiber raw materials are mixed by stirring.

3) Granulation: the mixed fiber raw materials are put into a granulator and extruded to produce fiber composite particles.

4) Prepare the mold: prepare a guitar body mold (including the head, neck and barrel, three parts of the body), a guitar body support mold, a headstock board mold, a soundboard mold, a fretboard mold and a bridge mold, a total of five molds.

5) Injection: material pre-drying: the fiber composite particles are put in a drying box, and dried at a temperature ranging from 60° C. to 80° C. for 4 hours, and then, the granulated raw materials dried are injected in a guitar body mold, a headstock board mold, a soundboard mold, a fretboard mold, and a guitar bridge mold to mold a guitar body, a headstock board, a soundboard, a fretboard, and a guitar bridge, respectively.

The specific parameters of injection are as follows:
Melt temperature: ranging from 190° C. to 230° C.;
Barrel temperature: rear section ranging from 180° C. to 200° C., middle section ranging from 190° C. to 220° C., front section ranging from 200° C. to 230° C.;
Mold temperature: ranging from 60° C. to 120° C.;
Forming time: ranging from 90 seconds to 180 seconds;
Injection pressure: ranging from 50 MPa to 180 MPa;
Mold holding time: ranging from 30 seconds to 90 seconds.

6) Assembling includes: firstly, the soundboard is connected into the guitar body; secondly, the headstock board and the fretboard are glued on the guitar body after the soundboard is connected into the guitar body; thirdly, the guitar bridge is installed on the guitar body to form a complete guitar.

7) Sanding and spraying includes: sanding the surface of the assembled guitar with a sander, filling the gaps between each component with filler, and then painting the surface of the guitar with color to spray paint.

8) Installing includes: a string pillow, a few of tuners, a few of strings, and other accessories are installed into the guitar body to form the guitar.

Example 3

1) Fiber pre-processing: the fiber raw materials are cut and prepared, and the raw materials have lengths between 0.2 millimeters to 3 millimeters.

2) Mixing: the fiber raw materials are mixed by stirring.

3) Granulation: the mixed fiber raw materials are put into a granulator and extruded to produce fiber composite particles.

4) Prepare the mold: prepare a guitar body mold (including the head, neck and barrel, three parts of the body), a guitar body support mold, a headstock board mold, a soundboard mold, a fretboard mold and a bridge mold, a total of five molds.

5) Injection: material pre-drying: the fiber composite particles are put in a drying box, and dried at 70° C. for 4 hours, and then, the granulated raw materials dried are injected in a guitar body mold, a headstock board mold, a soundboard mold, a fretboard mold, and a guitar bridge mold to mold a guitar body, a headstock board, a soundboard, a fretboard, and a guitar bridge, respectively.

The specific parameters of injection are as follows:
Melt temperature: ranging from 200° C. to 220° C.;
Barrel temperature: rear section ranging from 180° C. to 200° C., middle section ranging from 190° C. to 220° C., front section ranging from 200° C. to 230° C.;
Mold temperature: ranging from 80° C. to 100° C.;
Forming time: ranging from 90 seconds to 150 seconds;
Injection pressure: ranging from 80 MPa to 120 MPa;
Mold holding time: ranging from 40 seconds to 80 seconds.

6) Assembling includes: firstly, the soundboard is connected into the guitar body; secondly, the headstock board and the fretboard are glued on the guitar body after the soundboard is connected into the guitar body; thirdly, the guitar bridge is installed on the guitar body to form a complete guitar.

7) Sanding and spraying includes: sanding the surface of the assembled guitar with a sander, filling the gaps between each component with filler, and then painting the surface of the guitar with color to spray paint.

8) Installing includes: a string pillow, a few of tuners, a few of strings, and other accessories are installed into the guitar body to form the guitar.

Comparative Example 1

A specific preparation process of traditional acoustic guitars: starting from a procurement of raw materials, wood is usually artificially dried for 7-15 days from the time it is purchased, and the wood for first-class musical instruments is naturally air-dried for months or even years. The dried wood is cut into pieces and processed into a suitable size for parts such as soundboards, bottom decks, body sides, necks, bridges, fretboards, and sound beams. The processed sound beam is bonded to the panel in a certain arrangement, and the side plate is pressed to form a desired guitar curve by a hot press, and then the soundboards, the bottom decks, and the body sides are combined together to form a bucket body. Dovetails are defined in the bucket body and the neck, and then join them together. The bridge and fretboard are glued to the guitar, and the guitar is polished, sprayed (primer, color, and topcoat), and other steps. Finally, accessories such as string pillows, tuners and strings are installed in the guitar. The processing time is ranging from 30 to 45 days.

The guitars of this application are compared with the acoustic guitars (Spruce guitar/Mahogany guitar/Acacia guitar) in terms of mechanical performance and volume. A specific results are shown in TABLE 1 below:

TABLE 1 performance parameter comparison table

| Item | Guitar of this application | Spruce guitar | Mahogany guitar | Acacia guitar |
|---|---|---|---|---|
| Modulus of elasticity of material | 19 GPa | 7 GPa | 7 GPa | 8 GPa |
| Bending strength of material | 120 MPa | 45 MPa | 60 MPa | 66 MPa |
| Impact strength of material | 16 KJ/m$^2$ | 4.9 KJ/m$^2$ | 8.8 KJ/m$^2$ | 7.9 KJ/m$^2$ |
| Guitar Loudness (Plunge at the same velocity on an empty string) | 55 dB | 49 dB | 43 dB | 52 dB |
| Guitar Sustain (Plunge with the same velocity on an empty string) | 7.8 s | 7.1 s | 6.6 s | 7.2 s |
| Guitar dimensional change rate affected by temperature and humidity | 0.1% | 1.2% | 1.4% | 2.3% |

As can be seen from TABLE 1 above, the guitar according to the present disclosure is superior to the acoustic guitars in terms of volume and mechanical properties, so that a service life of the guitar according to the present disclosure can be 2 to 3 times longer than traditional acoustic guitars.

With the above configuration, the raw materials of the guitar are mainly fibers, compared with wood, the fibers can make the guitar be less susceptible to deformation due to humidity and can produce more stable and durable musical instruments. The guitar according to the present disclosure has a higher stiffness and a higher strength, which can well support tensions form the strings. Moreover, the guitar according to the present disclosure has a low density and a high stiffness. The guitar according to the present disclosure can obtain better acoustic quality through adjusting the sound beam structure of the guitar. Furthermore, the fibers are compatible with polymer base materials, so as to achieve a seamless connection from a guitar neck to structures of the guitar body, thereby ensuring batch products have an extremely small tolerances, and making the guitar capable of producing a bigger sound than a wood guitar of the same volume. Moreover, the guitar body, the headstock board, the soundboard, the fretboard, and the guitar bridge are integrally formed respectively, wherein the preparation procedures are simple and easy to operate. Furthermore, the preparation procedures can be carried out in relatively mild operating conditions, which can further reduces operating costs. The guitar has a more stable structure, a more stable sound transmission, and a better quality.

Furthermore, compared with a traditional carbon fiber guitar, which is laminated with carbon fiber cloth multiple times and cured with a thermosetting resin such as epoxy resin, the guitar of this disclosure uses short fibers to injection molding to form some components of the guitar of the disclosure, which has a shorter molding time and is easier to be integrated. The integrated molding can not only simplify the manufacturing process of the guitar, but also realize industrial automation, thus reducing a labor cost of guitar production.

Implementations of the above disclosure will now be described by way of embodiments only. It should be noted that devices and structures not described in detail are understood to be implemented by the general equipment and methods available in the art.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A guitar comprising:
   fibers of lengths between 0.2 millimeters to 3 millimeters;
   polymer base materials; and
   a guitar body comprising a headstock, a neck, and body sides, the headstock, the neck, and the body sides are continuously and integrally formed the guitar body, so the guitar body is molded by a single piece.

2. The guitar of claim 1, wherein the fibers are at least one of glass fibers, wood fibers and carbon fibers; and the and polymer base materials are at least one of acrylonitrile-butadiene-styrene copolymer, acrylate-styrene-acrylonitrile copolymer, and polycarbonate.

3. The guitar of claim 1, the guitar comprising:
   a headstock board;
   a soundboard;
   a fretboard; and
   a guitar bridge, wherein each of the guitar body, the headstock board, the soundboard, the fretboard, and the guitar bridge is a continuous and single structure.

4. The guitar of claim 3, wherein the guitar body comprises a bottom deck, the headstock, the neck, the bottom deck, and the body sides are continuously and integrally formed the guitar body, the guitar body is molded by a single piece; and a bucket body is defined by the bottom deck and the body sides.

5. The guitar of claim 4, wherein the soundboard is connected to the bucket body of the guitar body; the headstock board is formed on the headstock; the fretboard is formed on the neck of the guitar body; and the guitar bridge is installed on the soundboard.

6. A manufacturing method for a guitar, comprising:
   mixing raw materials by stirring, granulating the mixed raw materials, and drying the granulated raw materials at a temperature ranging from 60° C. to 80° C.; wherein the raw materials comprise fibers having lengths between 0.2 millimeters to 3 millimeters;

injecting the dried and granulated raw materials into each of a guitar body mold, a headstock board mold, a soundboard mold, a fretboard mold, and a guitar bridge mold to form a guitar body, a headstock board, a soundboard, a fretboard, and a guitar bridge, respectively; and assembling, sanding, spraying, and installing the guitar body, the headstock board, the soundboard, the fretboard, and the guitar bridge to form a guitar.

7. The manufacturing method of claim 6, wherein, the fibers are at least one of glass fibers, wood fibers and carbon fibers.

8. The manufacturing method of claim 6, wherein a method for injecting the dried and granulated raw materials comprises:

melting the raw materials at a temperature ranging from 190° C. to 230° C. to form barrel materials;

maintaining the barrel materials at a temperature ranging from 180° C. to 230° C. for a preset period of time; and injecting the barrel materials into the guitar body mold, the headstock board mold, the soundboard mold, the fretboard mold, and the guitar bridge mold at a temperature ranging from 60° C. to 120° C.

9. The manufacturing method of claim 8, wherein maintaining the barrel materials a temperature ranging from 180° C. to 230° C. for a preset period of time further comprising:

maintaining the barrel materials a temperature ranging from 180° C. to 200° C.;

maintaining the barrel materials a temperature ranging from 190° C. to 220° C.; and maintaining the barrel materials a temperature ranging from 200° C. to 230° C.

10. The manufacturing method of claim 6, wherein a method of injecting the dried and granulated raw materials further comprising:

controlling an injection pressure between 50 MPa to 180 MPa, and controlling a molding time between 90 seconds to 180 seconds.

11. The manufacturing method of claim 6, wherein before mixing the raw materials, the method further comprising:

pre-drying the raw materials in a temperature between 60° C. to 80° C. for 3 hours to 5 hours.

12. The manufacturing method of claim 6, wherein a method of assembling the guitar body, the headstock board, the soundboard, the fretboard, and the guitar bridge comprises:

connecting the soundboard to the guitar body;

gluing the headstock board and the fretboard on the guitar body after the soundboard is connected to the guitar body; and installing the guitar bridge on the soundboard.

13. The manufacturing method of claim 12, wherein the guitar body comprising a headstock, a neck, a bottom deck, and body sides, and a bucket body is defined by the bottom deck and the body sides.

14. The manufacturing method of claim 13, further comprising:

connecting the soundboard to the bucket body of the guitar body;

forming the headstock board on the headstock;

forming the fretboard on the neck of the guitar body; and installing the guitar bridge is installed on the soundboard.

15. The manufacturing method of claim 6, wherein a process for sanding and spraying comprises:

sanding surfaces of the assembled guitar with a sander, filling gaps between the guitar body, the headstock board, the soundboard, the fretboard, and the guitar bridge with a filler material; and painting the surface of the guitar by spray painting.

16. The manufacturing method of claim 6, before injecting, further comprising:

keeping the guitar body mold, the headstock board mold, the soundboard mold, the fretboard mold, and the guitar bridge mold warm.

* * * * *